United States Patent [19]
Futa, Jr. et al.

[11] Patent Number: 5,332,233
[45] Date of Patent: Jul. 26, 1994

[54] FACE SEAL MEANS

[75] Inventors: Paul W. Futa, Jr., North Liberty, Ind.; George S. Wieger, Niles, Mich.

[73] Assignee: Allied-Signal Inc., Morristown, N.J.

[21] Appl. No.: 979,091

[22] Filed: Nov. 19, 1992

[51] Int. Cl.$^5$ ............................................. F16L 23/00
[52] U.S. Cl. ........................................ 277/27; 277/48; 277/175; 277/188 R; 285/101; 285/375
[58] Field of Search ................... 277/27, 47, 48, 175, 277/188 R, 188 A, 207 R; 285/100, 101, 267, 279, 375

[56] References Cited

U.S. PATENT DOCUMENTS

| | | | |
|---|---|---|---|
| 2,757,682 | 8/1956 | Nicks | 285/375 |
| 3,899,199 | 8/1975 | Garey | 285/101 |
| 4,138,149 | 2/1979 | Bormioli | 285/375 |
| 4,688,830 | 8/1987 | Meisinger et al. | 285/100 |
| 4,787,654 | 11/1988 | Zeitlin | 285/101 |
| 5,015,016 | 5/1991 | Smith, III | 277/27 |

*Primary Examiner*—William A. Cuchlinski, Jr.
*Assistant Examiner*—Daniel G. DePumpo
*Attorney, Agent, or Firm*—Leo H. McCormick, Jr.; Larry J. Palguta; Robert A. Walsh

[57] ABSTRACT

A seal for preventing leakage of pressurized fluid along a flow path along an engagement plane between a first and second members. The seal has a cylindrical body with a first elastomeric ring located on an end and a second elastomeric ring located on a peripheral surface of the cylindrical body. The cylindrical body is located in a passage in the second member. A spring urges the first elastomeric ring into engagement with a face on the first member when the first and second members are joined together. Pressurized fluid which flows from a passage in the first member into the second passage in the second member acts on the cylindrical body to further urge the end into engagement with the first member to prevent fluid leakage along the engagement plane there between.

1 Claim, 1 Drawing Sheet

FACE SEAL MEANS

This invention relates no a seal responsive no a fluid pressure in fluid communicated through a first passage to a second passage to prevent leakage along a flow path in an engagement plane between first and second members.

When first and second housings are joined together it is common practice to place a seal therebetween when fluid is communicated from a passage in the first housing to a passage in the second housing. Seals can compensate for minimal changes that may occur between the first and second housings caused by expansion resulting from changes in fluid pressure and temperature of an environment or from surface irregularities that may occur during the manufacture of the members and as a result such seals function in a satisfactory manner when the extrusion gap of the engagement plane is controlled. However, such changes can cause the engagement plane to expand and as a result the extrusion gap also increases. With an expanded extrusion gap, their is a possibility of such seals flowing into the engagement plane and as a result seals can be torn or damaged in a manner which can thereafter allow a leak path to develop along the engagement plane.

In the invention disclosed herein, fluid under pressure is communicated from a first passage in a first member to a second passage in a second member. A seal located in the second passage prevents fluid from leaking along a flow path created by an engagement plane of the first and second members. The seal has a cylindrical body with a first end having a first elastomeric ring located in a groove therein and a second elastomeric ring located in a groove on its peripheral surface adjacent a second end. A spring or other resilient member located in the second passage acts on the second end to create an initial closure force which urges the first elastomeric ring into engagement with the first mender to form an initial seal along the engagement plane. As fluid flows into the second passage, the fluid pressure therein acts on the difference between the effective area between the location of the second elastomeric ring and the first elastomeric ring to create an additional force for correspondingly urging the first end of the cylindrical body into engagement with the face on the first member to further seal the engagement plane and retain all the fluid in the first and second passages.

It is an object of this invention to provide a seal member for preventing leakage along an engagement plane between first and second members.

It is a further object of this invention to provide a seal means which minimizes an extrusion gap through the development of a closure force that is a function of a resilient member and fluid pressure in fluid communicated from a first member to a second member.

These objects and other advantages of the present invention should be apparent from reading this specification while viewing the drawing wherein.

Figure 1:
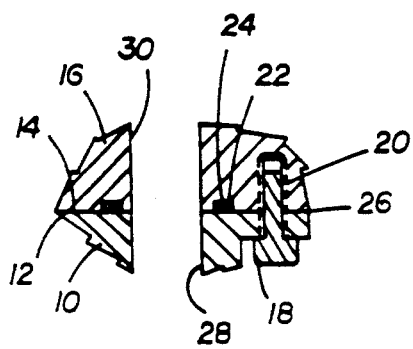
FIG. 1 is a sectional view of a typical prior art connection between a first member and a second member with a seal therebetween to prevent leakage of fluid from passages therein.

In the embodiment shown in FIG. 1, a first member 10 has a surface 12 which engages surface 14 on a second member 16 when held together by a mechanical means such as when bolts 18 (only one is shown) are mated with threads 20. Member 16 has a groove 22 which retains an elastomeric seal 24 to form a barrier which prevents fluid leakage along an engagement plane 26 when pressurized fluid flows from passage 28 into passage 30. Seal 24 forms a barrier to prevent leakage along the engagement plane 26 until changes in the environmental temperature or wear and manufacturing irregularities allow surfaces 12 and 14 to separate causing seal 24 to extrude and allow fluid to leak from passages 28 and 30.

Figure 2:
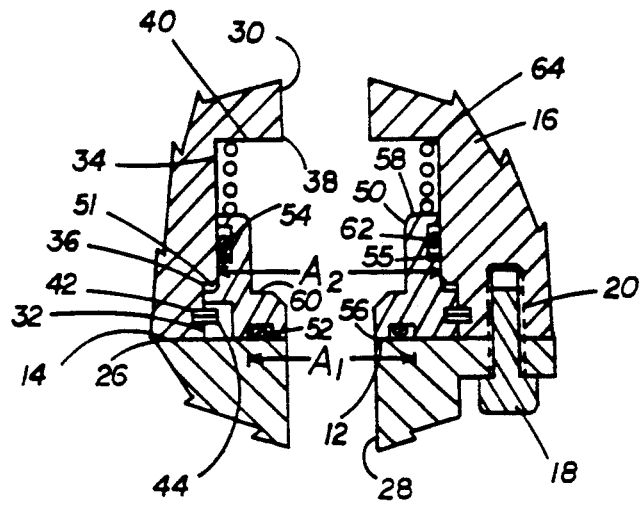
FIG. 2 is a sectional view of a seal made according to the present invention which prevents leakage along an engagement plane between first and second members.

In the embodiment shown in FIG. 2, components similar to those in FIG. 1 are identified by the same number. Passage 30 in member 16 is enlarged adjacent surface 14 to include a first diameter section 32 which is separated from a second diameter section 34 by a first shoulder 36. The second diameter section 34 is separated from a third diameter section 38, which defines the size of passages 30, by a second shoulder 40. The first diameter section 32 has a groove 42 therein which is adapted to retain a snap ring 44 which engages annular projection 51 to retain a cylindrical body 50 in passage 30.

Cylindrical body 50 has a first end 56 and a second end 58. A first groove 60 is located on the first end 56 retains a first elastomeric ring 52 while a second groove 62 is located on a peripheral surface of the cylindrical body 50 adjacent the second end 58 retains a second elastomeric ring 54 and a back up ring 55 to seal passages 28 and 30 from the engagement plane 26. The first elastomeric ring 52 engages a face on surface 12 of member 10 to define a first effective area $A_1$ on cylindrical body 50. The second elastomeric ring 54 engages surface 34 on the second member 16 to define a second effective area $A_2$ on cylindrical body 50.

A spring or resilient member 64 is located in passage 30 with a first end that engages shoulder 40 and a second end that engages the second end 58 of cylindrical body 50. Spring 64 acts on the second end 58 to provide an initial closure force that urges elastomeric ring 52 into engagement with surface 12 to seal passages 28 and 30 from the engagement plane 26. Fluid under pressure is communicated from passage 28 in member 10 to passage 30 in member 16. The fluid pressure $P_x$ in passage 30 acts on the difference in the effective area $(A_2 - A_1)$ to create an additional closure force which urges end 56 of the cylindrical body 50 into engagement with surface 12 to seal passage 30 from the engagement plane 26. It should be understood that the same fluid pressure $P_x$ acts on elastomeric ring 54 to seal surface 34 from the engagement plane 26. Thus in operation, the additional closure force is dependent on the fluid pressure of the fluid and as the fluid pressure increases so does the closure force to maintain the sealed relationship of passages 28 and 30 from the surrounding environment.

Figure 3:
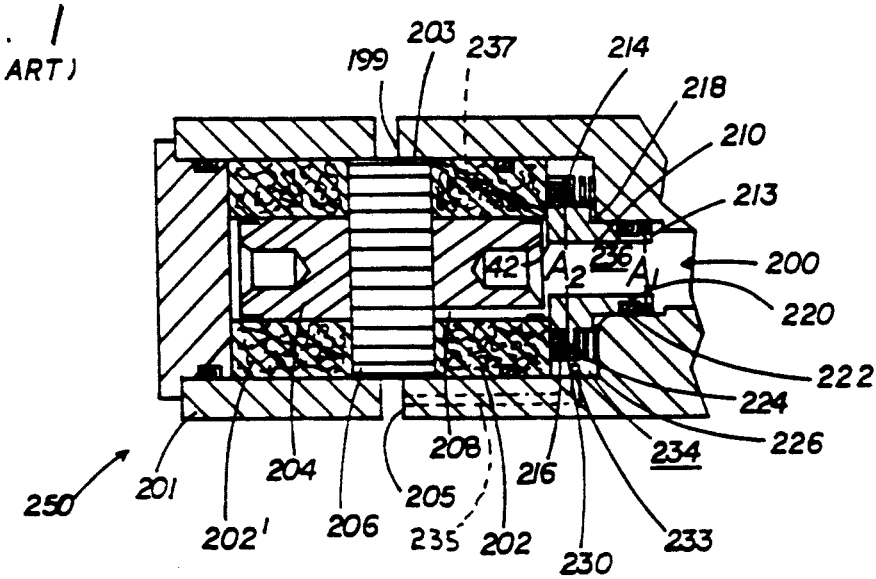
FIG. 3 is a sectional view of the seal made according to the present invention for use in conjunction with a bearing in a pump.

The seal 200 of FIG. 3 in conjunction with a carbon bearing 202 used in a pump 250, of a type disclosed in U.S. patent application 946,264 filed Sept. 16, 1992 entitled "Gear Pump with Controlled Clamping Force", seal a low pressure chamber 236 from a high pressure chamber 234. In pump 250, carbon bearings 202, 202' retain a shaft 204 associated with a gear 206 in a bore 203 of housing 201. Gear 206 is mated with a corresponding gear (not shown) and when these gears are rotated, fluid pressure develops as a result of compressing fluid into a smaller space. This majority of resulting fluid pressure is communicated through an outlet port 205 as pressurized fluid to operate various devices while a first portion thereof is directed by conduits 235 through opening 233 to act on bearing 202 and form a clamping force and a second portion thereof is communicated to a low pressure chamber 236 through a slot 208 in bearing 202 to cool shaft 204. The low pressure cheer 236 is connected to a low pressure area in the pump 250 adjacent input port 199 by conduit 237 to retain the operational fluid within bore 203 of housing 201.

In more detail, seal 200 has a stepped diameter on peripheral surface 218 of a cylindrical body 210 which has a first end 212 and a second end 213. First end 212 has a groove 214 located therein for retaining a first elastomeric ring 216 while peripheral surface 218 on cylindrical body 210 has a groove 220 for retaining a second elastomeric ring 222. A resilient member or spring 224 which is located between a shoulder 226 on housing 201 and a flange 230 on cylindrical body 210 urges elastomeric member 216 into engagement with a face on carbon bearing 202 to prevent communication of pressurized fluid from the high pressure chamber 234 surrounding seal 200 to into the lower pressure chamber 236. The fluid pressure in chamber 236 acts on the effective area $A_1$ formed on cylindrical body 210 with elastomeric ring 222 to create a first force which opposes a second force created by fluid pressure in chamber 234 acting on the effective area $A_2$ formed on cylindrical body 210 with elastomeric ring 216 to develop an additional force which is combined with the force of spring 224 to establish a closure force which establishes a sealing force which prevents fluid in chamber 234 from being communicated to chamber 236 along an engagement plane therebetween. In addition, the resulting closure force urges bearing 202 in engagement with gear 206 to assure that pressurized fluid developed through rotation of the gears is communicated through slot 208 to cool shaft 204. The location of the first and second elastomeric rings 216 and 222 on cylindrical body 210 can be controlled to establish the effective areas $A_2$ and $A_1$ and thus aid in establishing the closure or clamping force of pump 250.

We claim:

1. In a system having a first member with a first face thereon which engages a second face on a second member, said first member having a first passage therein in alignment with a second passage in said second member to communicate pressurized fluid $P_x$ from said first passage to said second passage, said second passage in said second member having a first diameter separated from a second diameter section by a first shoulder and a third diameter section separated from said second diameter section by a second shoulder, the improvement in seal means for preventing leakage of pressurized fluid $P_x$ along a flow path between said first and second faces comprising:

a cylindrical body having a first end and a second end, said cylindrical body having a first groove located in said first end, a second groove located on a peripheral surface that engages said second diameter section of said second passage adjacent said second end and an annular projection located on said peripheral surfaces and engaging said first diameter section of said second passage;

a first elastomeric ring located in said first groove which engages said first face to form a first effective area $A_1$ on said cylindrical body;

a second elastomeric ring located in said second groove which engages said second member to form a second effective area $A_2$ on said cylindrical body;

a backup ring located in said second groove to prevent said pressurized fluid from extruding said second elastomeric ring from said second passage;

retainer means attached to said second member in said first diameter to engage said annular projection to retain said cylindrical body in said second passage;

fastener means for securing said second member to said first member to bring said first face into engagement with said second face; and resilient means being caged between said second shoulder in said second passage and said second end of said cylindrical body to provide an initial closure force for urging said first elastomeric ring into initial engagement with said first face to prevent fluid communication along a flow path created between said first and second faces, said pressurized fluid $P_x$ acting on the difference between the first and second effective areas $(A_2-A_1)$ to create an additional closure force for urging said first end of said cylindrical member into engagement with said first face to further prevent communication of pressurized fluid $P_x$ along said flow path.

* * * * *